United States Patent [19]

Tzeng

[11] Patent Number: 5,114,348
[45] Date of Patent: May 19, 1992

[54] TUTORIAL DEVICE FOR OBSERVING LUNAR PHASE

[76] Inventor: Shui-Tan Tzeng, 7F~1, No. 2, Lane 34, Mo Fan st., Taichung, Taiwan

[21] Appl. No.: 552,565

[22] Filed: Jul. 16, 1990

[51] Int. Cl.⁵ .............................................. G09B 23/00
[52] U.S. Cl. ..................................... 434/284; 434/289; 434/292
[58] Field of Search ............... 434/364, 394, 402, 284, 434/289, 292, 285; 33/269

[56] References Cited

U.S. PATENT DOCUMENTS

| | | | |
|---|---|---|---|
| 531,060 | 12/1984 | Ormsby | 434/284 |
| 554,809 | 2/1896 | Yaggy | 434/284 |
| 792,336 | 6/1905 | Lewis | 434/284 |
| 2,350,374 | 6/1944 | Speert | 434/284 |
| 3,290,799 | 12/1966 | Eisenhauer | 434/285 |

FOREIGN PATENT DOCUMENTS 0847340  7/1981  U.S.S.R. .................... 434/284

Primary Examiner—Richard J. Apley
Assistant Examiner—Karen Richard
Attorney, Agent, or Firm—Fleit, Jacobson, Cohn, Price, Holman & Stern

[57] ABSTRACT

The invention provides a tutorial device for observing lunar phase. A base sheet is inscribed with a time scale, a ring of moon pictures and a ring of moon phases. Outer circles on the base sheet define the months, and times of moonrise, moonset and moonsharp. Mounted on the base are a rotary segment shaped moonguide, a globe longitude disc and an elevation disc with a graduated moon angle scale and a pivoted elevation finger. The movable elements are used in conjunction with the fixed rings and circles on the base sheet to obtain moon data for selected times and earth longitudes.

4 Claims, 6 Drawing Sheets

TUTORIAL DEVICE FOR OBSERVING LUNAR PHASE

BACKGROUND OF THE INVENTION

The present invention relates to tutorial implement for observing lunar phase.

SUMMARY OF THE INVENTION

The object of the present invention focuses on helping people especially students of primary school and high school to establish an exact concept of "moon phase" and allows a user to understand (1) the change of month and moon phase while the moon revolves around the earth, and (2) that moon movement is naturally caused by earth rotation.

According to the present invention, a tutorial device for observing lunar phase includes a base, the center of the base which is inclined is provided with a moon guide, globe longitude and elevation disc by a joint member. The globe longitude disc and elevation disc are set on the user's local longitude by a fixed member. An elevation finger is set upon the fixed member. Sequently, the surface of the base is marked with rings indicative of time, moon picture, moon phase, moon age, the time of moonset, moonsharp, moonrise and sun picture in concentric circles.

The present invention may best be understood through the following description with reference to the accompanying drawings, in which:

DETAILED DESCRIPTION OF PREFERRED EMBODIMENTS

Figure 1:
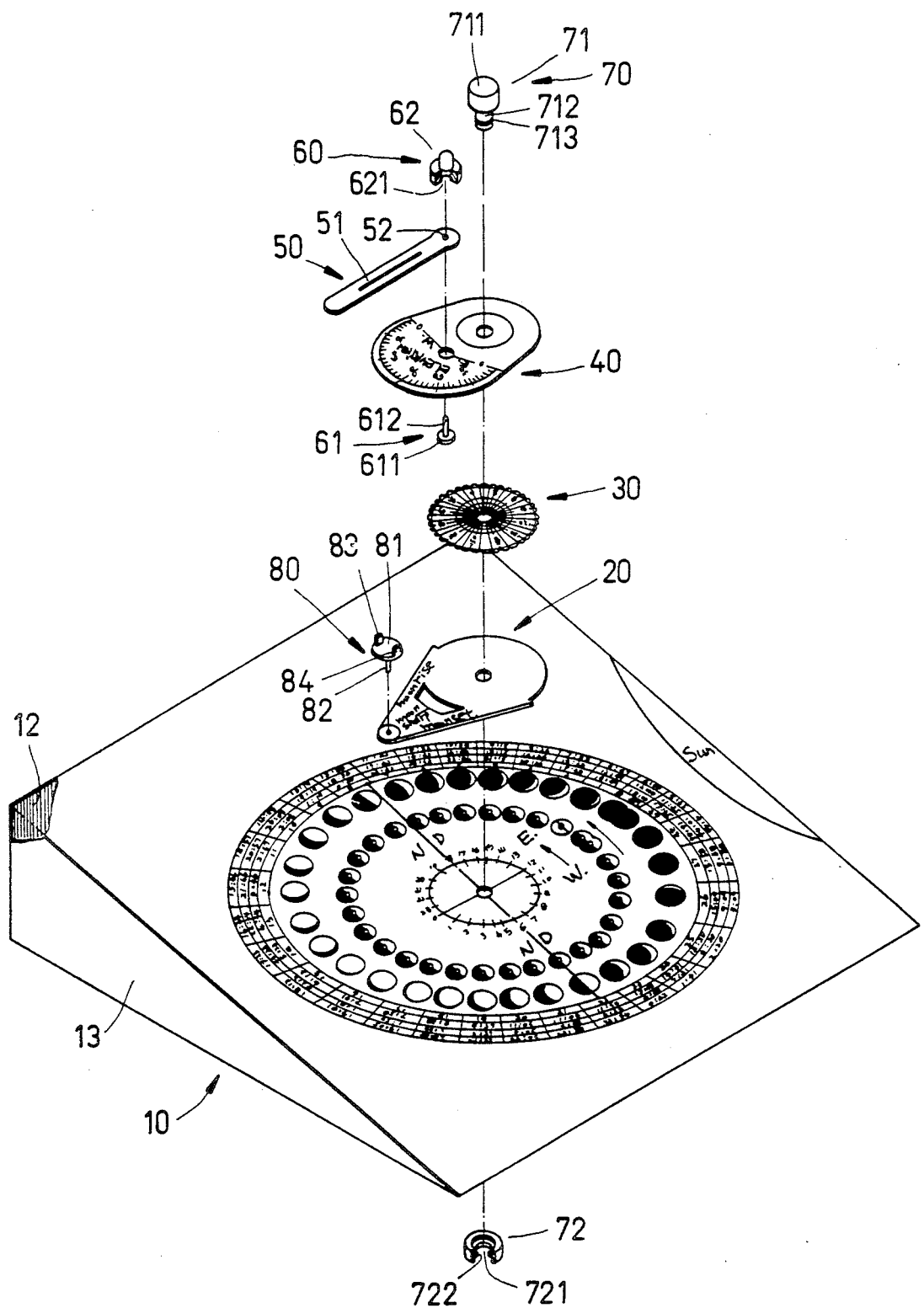
FIG. 1 is an exploded perspective view of a tutorial device according to the present invention.

Referring now to FIGS. 1-6, the present invention includes a base 10, a moon guide 20, a globe longitude disc 30, an elevation disc 40, an elevation finger 50, a fixed member 60, rotatably mounted in segments on the base, a joint member 70 and a fixed direction element 80.

Base 10 made of cardboard, contains a rectangular base sheet 11 from which extends a back plate 12 and two wedge-shaped side plates 13, 14. Tongues 131, 141 in the side plates are adapted to fit in slits 121 in the back plate to set the base sheet on an incline when the base is folded for use. A hole 111, and a marked 24-hour-graduation scale 112 are provided on the center of the base 11. A moon picture ring 113 and a moon phase ring 114 for each month form concentric circles around graduation 112. The moon picture ring 113 shows the sunshine on moon orbit of every month. A first fixed direction hole 113a is provided in the center of each moon picture of ring 113. The moon phase ring 114 shows the moon phases of every month, the "month" being approximately the same as the lunar date. The base has 1st, 2nd, 3rd and 4th circles 115, 116, 117 and 118 around ring 14 which are divided into 29½ parts for indicating respectively, each month, times of moonset, times of moonsharp and times of moonrise. The sun 119 is pictured at the right of the base 10.

Figure 4:
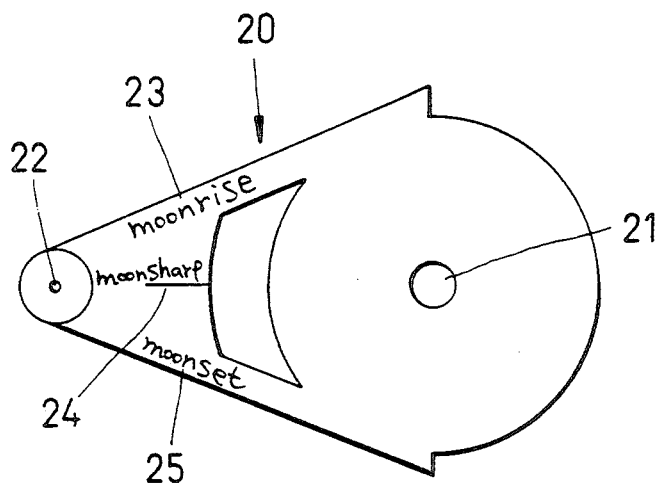
FIG. 4 is a top view of a moon guide.
Figure 5:
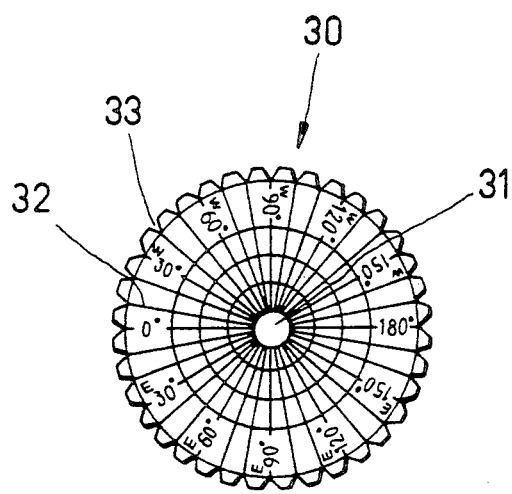
FIG. 5 is a top view of a globe longitude disc.
Figure 6:
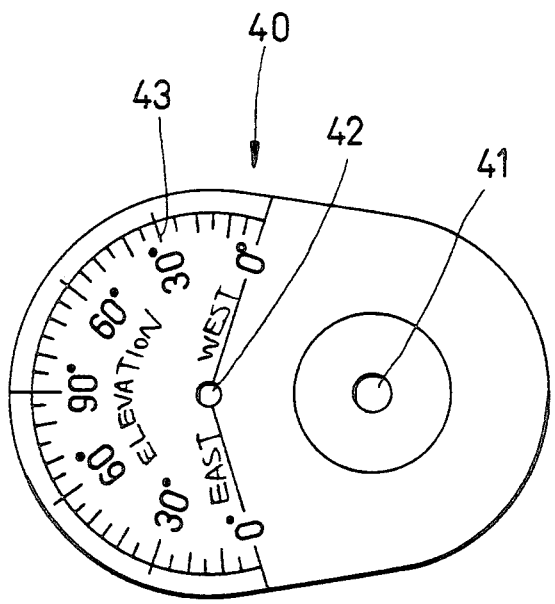
FIG. 6 is a top view of an elevation disc.
Figure 7:
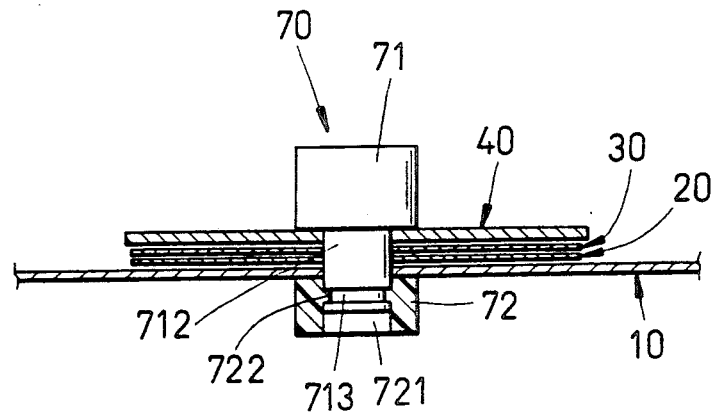
FIG. 7 is a sectional view taken along line 7—7 of FIG. 2.

Moon guide 20 made of board, is segment-shaped, as shown in FIG. 4 with a hole 21 in the large end and a second hole 22 in the small end. The two side edges of the guide 23 and 25 and a central line 24 indicate respectively the time of moonrise at 23, moonsharp at 24 and moonset at 25.

Globe longitude disc 30 (FIG. 5) is circular with, a hole 31 in the center, radial longitude lines 32 inscribed thereon and a notch 33 at the end of each longitude line.

Elevation disc 40 which is mounted on the globe longitude disc 30 is lobe-shaped and made of stiff transparent acrylic-plastic sheet. A hole 41 is formed at the center of the smaller end and a bearing hole 42 is formed in the larger end to align with the notches 33 of the globe longitude disc 30. A graduated scale 43 is marked around the larger end of the disc.

Elevation finger 50 is mounted in hole 42 of the elevation disc 40 by fixing member 60 and comprises a strip of stiff transparent material. A line 51 is marked on the elevation finger and a second bearing hole 52 is formed at its one end for receipt of the fixing member.

Fixed member 60 includes a base 61 made of plastic and an upper element 62. The base 61 has a head 611, and a pin 612 extending from the head 611. The bottom of the upper element 62 has a hole which is a press fit on pin 612.

Joint member 70 is also made of plastic and includes a shaft portion 71 and a button 72. The shaft portion 71 has a head 711, a leg 712 extended downwardly from the head 711, and a groove 713 forming the lower end of the leg 712. The button 72 has a bore 721 with a ridge 722 to fit in groove 713.

Fixed direction element 80 has a base 81 from which depends a pin 82, and two arms 83, and 84 extend upwardly from the base. The pin fits in hole 22 of the moon guide.

The device is set up as follows:

1. The hole 41 of the elevation disc 40 is aligned with the hole 31 of the globe longitude disc 30, and the relative notch 33 representing the local longitude (for example, the Taiwan District locates at E. longitude 120°) is aligned with the bearing hole 42 of the elevation disc 40. Pin 612 is inserted upwardly through the aligned notch 33 and hole 42, hole 52 of elevation finger 50 is inserted on the pin and the finger 50, disc 40 and disc 30 are connected together by attaching upper member 62 to pin 612.

2. Leg 712 of joint member 70, is sequentially inserted through the holes 41 in disc 40, the hole 31 in globe longitude disc 30, the hole 21 of the moon guide 20 and the hole 111 of the base 10. Button 72 is then attached to the bottom of leg 712.

3. To position the moon guide 20, pin 82 of the fixed direction element 80, is inserted through hole 22 on the moon guide 20, and the hole 113a of one of the moon pictures 113 on the base 10.

4. The tongues 131 and 141 are inserted in the slits 121 after folding the panels 12, 13 and 14 so that the base 11 is supported on an incline to facilitate operation and observation.

The device can be used to count the correct month as follows: first, the date is obtained from a lunar calendar. Secondly, the moon guide 20 is set by element 80 on the moon picture 113 where the month is equivalent to the lunar date. The time of moonrise, moonsharp and moonset can be read off. For example, when the date is lunar February 12, the moon guide 20 is set on moon guide directing month 12° to obtain the times of moonrise, moonsharp and moonset as 15:46, 21:46 and 3:46 on rings 116, 117 and 118. The month is 12 when the moon is straight upon the observer at 21:46, and is about 12:5 when the time is 22:15 of moonsharp. The reason is that the date of the lunar calendar does not represent the real month.

Further, the device can be used to observe moon phase, judge the month, and make a "Moon Moving Picture". The operating stages are as follows:

1. The moon guide 20 is set on a moon picture 113 that corresponds with an observed moon phase, i.e., if the observed moon phase is nearing but not yet full, the user judges that the month should be 14, and sets the moon guide on the moon picture 113 that corresponds with month 14.

2. The elevation disc 40 is rotated to aim the member 60 at the time-graduation 112 corresponding to a selected time, and line 51 of the elevation finger 50 is lined up with the hole 113 of the fixed moon picture 113 to which the moon guide has been set. The overlap angle is then read off from scale 43 on the elevation disc 40 by the line 51 and is recorded, for example, moon 21,14° East at 18:00, about 10° at 9:00, 25 at 20:00 are applicable for the setting of month 14 ... The changes per hour can be individually recorded.

Figure 9:
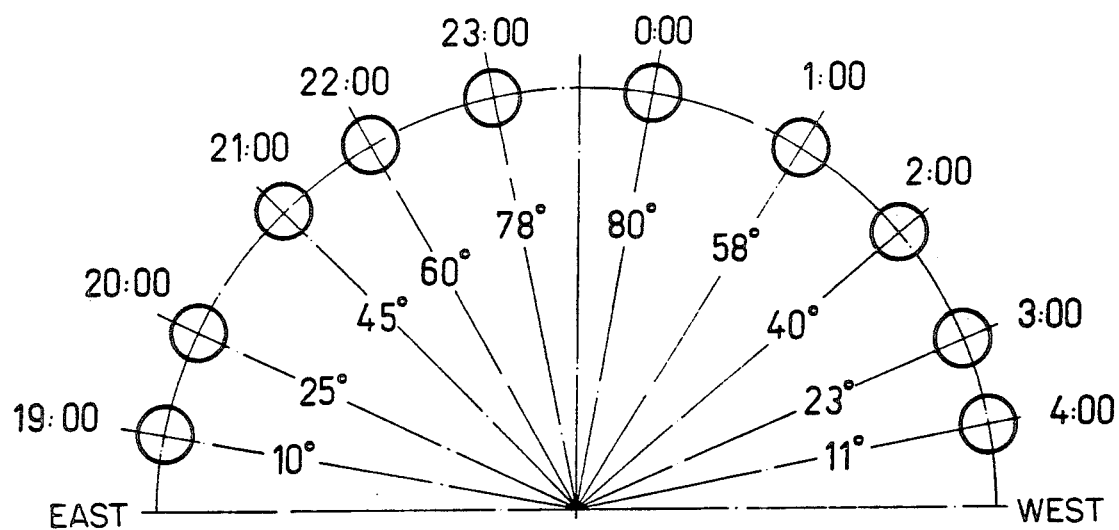
FIG. 9 is a "Moon Moving Picture" drawn by use of the present invention.

3. In accordance with the above information, a moon moving picture can be made of the angles of the moon by use of an index center, such as shown in FIG. 9.

Figure 2:
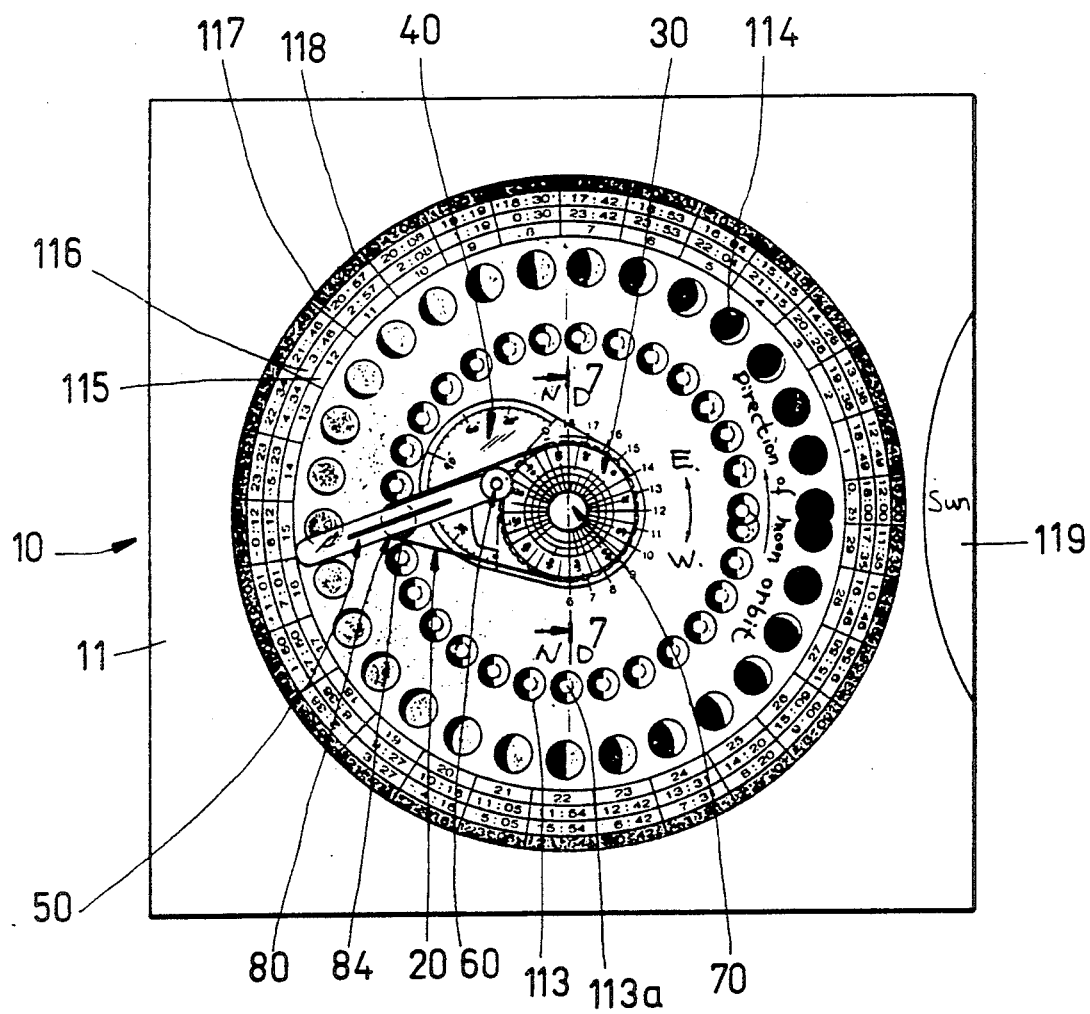
FIG. 2 is a plan view of the device.
Figure 3:
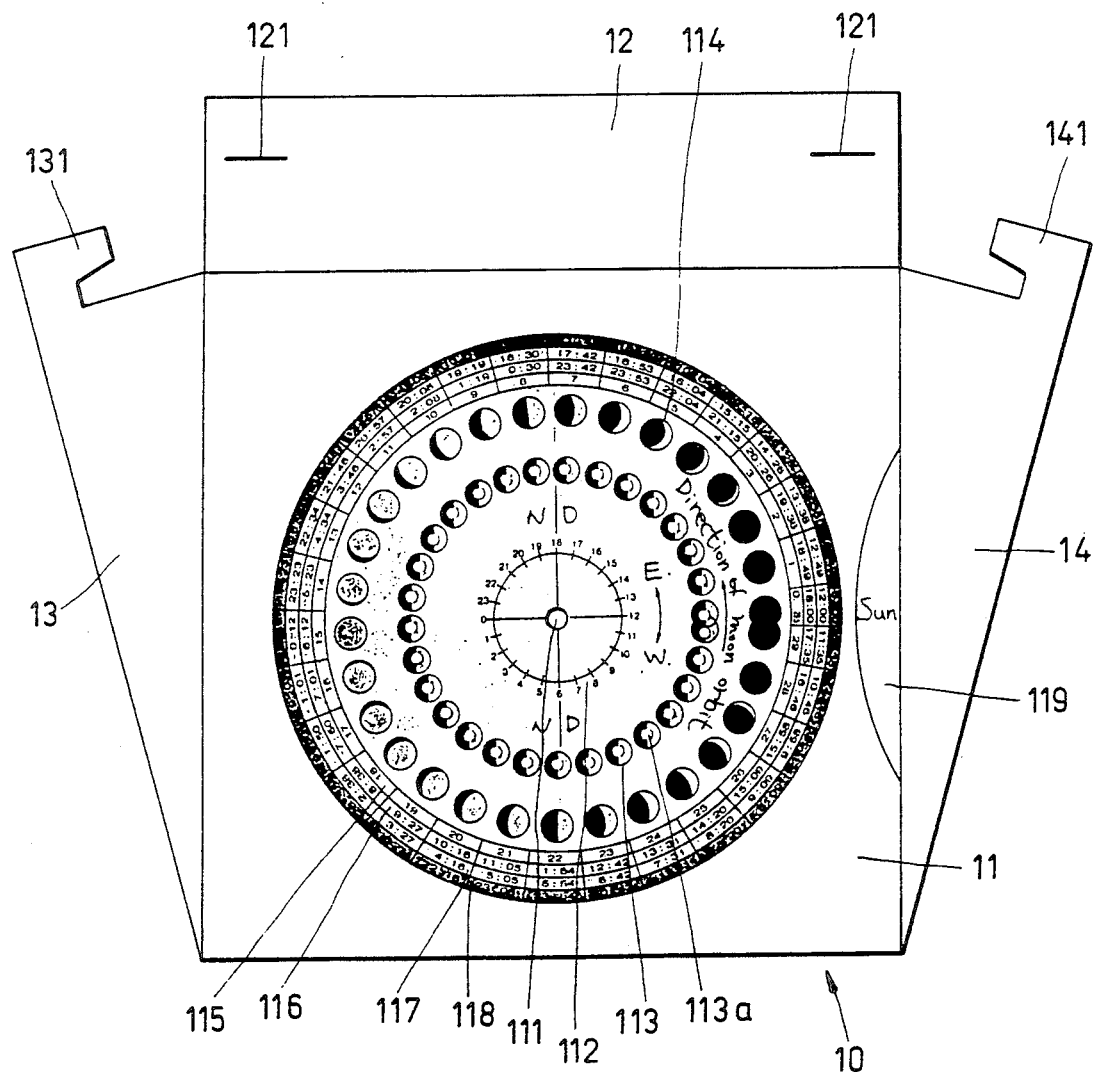
FIG. 3 is a plan view showing the base of the device prior to assembly.
Figure 8:
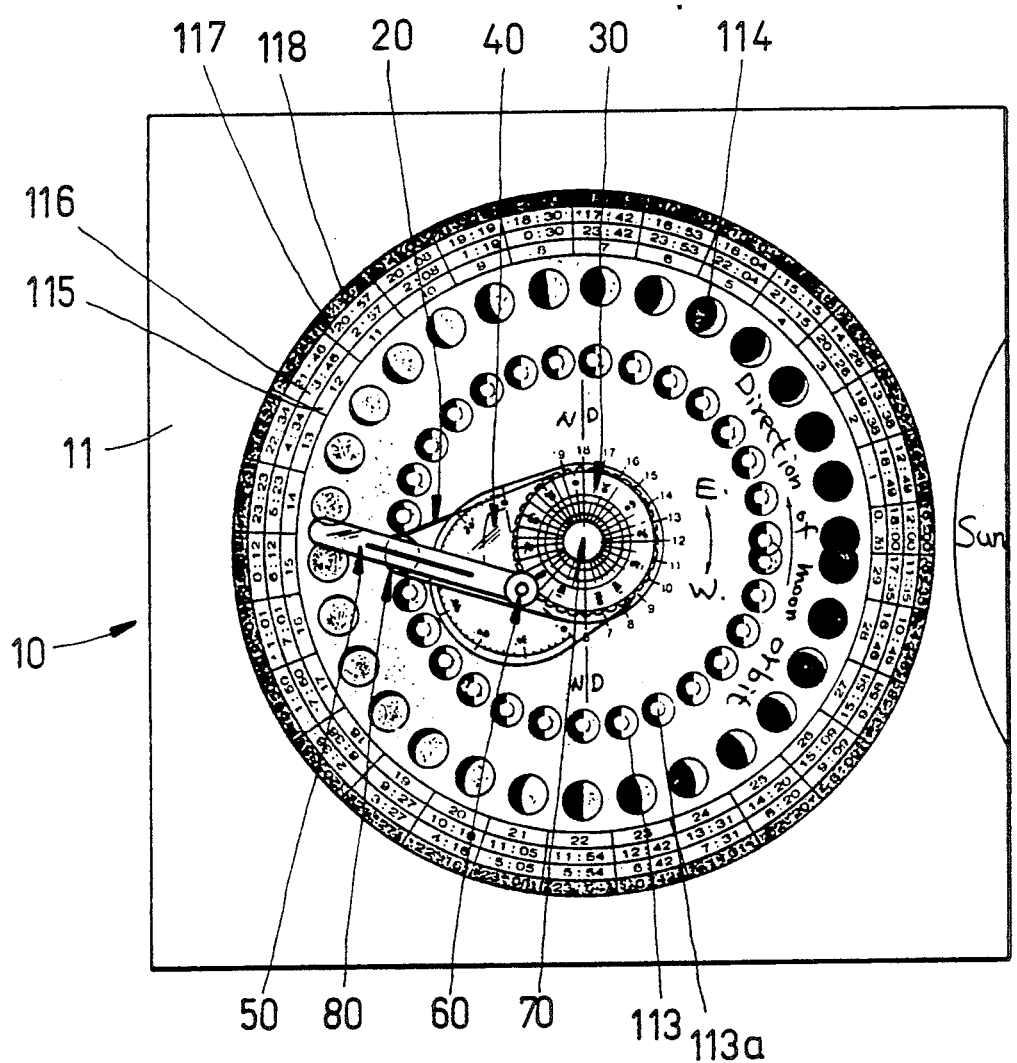
FIG. 8 is a schematic view of the present invention in operation.

As shown in FIG. 2 and FIG. 8, when the elevation disc 40 is rotated, the elevation finger 50 will be guided by the two arms 83, 84 of the fixed direction element 80.

The present invention is suitable for use worldwide. A user can choose and set the fixed member 70 on the longitude where he resides, i.e., Taiwan is at E. longitude 120°, Japan is at E. longitude 140°, New York, is at W. longitude 70°. This information is obtained from a world map.

The effects which can be obtained by the present invention are as follows:

(1). For each rotational cycle to indicate relative location of the moon and earth from month 0, 1, 2 ..., 28, 29, 29.5, 0. Also, to observe the moon phase from the earth. The user can use the moon guide to point out the location of the moon to count the month, and the relative location of the moon, earth, and sun by the observed moon phase. It also lists the times of moonrise, moonsharp and moonset to assist students in learning about moon concepts.

(2). The turntable earth longitude disc can be fixed under the transparent elevation disc 40 and finger 50. To observe the direction of the moon, i.e., at the east or west sky, and the moon elevation angle at selected times. Since the movement of the earth longitude disc is alike to the movement of earth time, it causes the observation of the changes of earth angle; and the natural appearance of the rotation of the earth.

While the invention has been described in connection with what is presently considered to be the most practical and preferred embodiments, it is to be understood that the present invention is not to be limited to the disclosed embodiments but on the contrary, is intended to cover various modifications and equivalent arrangements included with the spirit and scope of the appended claims which scope is to be accorded the broadest interpretation so as to encompass all such modifications and equivalents.

What I claim is:

1. A tutorial device for observing lunar phase comprising:

a base sheet with a central hole, a time-graduation scale, a ring of moon pictures and a ring of moon phases provided on the base sheet around the central hole, a direction hole in the center of each moon picture, each moon picture showing sunshine on the moon during orbit of the moon per month, said ring of moon phases showing the morphology of the month, 1st, 2nd, 3rd, and 4th circles around the ring of moon phases for indicating individually the respective month and times of moonset, moonsharp and moonrise, and a depiction of the sun outside the 4th circle;

a segment-shaped moon guide disc mounted for rotation about the central hole through a hold in a larger end of the moon guide, a further direction hole in a smaller end of the moon guide to align with the direction holes in each moon picture, the moon guide having opposite edges and a central line forming moonrise, moonsharp and moonset lines respectively;

a circular globe longitude disc with a central hole mounted coaxially over the moon guide, at least one radial longitude line on the longitude disc and a peripheral notch at the outer end of said longitude line;

a transparent elevation disc rotatably and coaxially mounted over the globe longitude disc by a hole in the elevation disc, the elevation disc having an outer end with a graduated moon angle scale and a further hole centrally of said moon scale to align with said notch of the globe longitude disc;

a transparent elevation finger rotatably mounted in said further hole in said elevation disc to extend outwardly of said angle scale, the finger including an angle indicating line;

a first journal member for attaching said finger to said elevation disc and for locating the elevation disc relative to said notch in the globe longitude disc;

a second journal member in the central hole of said base sheet for mounting said elevation disc, said globe longitude disc and said moon guide on the base sheet; and a direction element for locating said moon guide in a direction hold of a selected moon picture and for guiding the elevation finger.

2. A device as claimed in claim 1, wherein said direction element comprises of a base with a depending pin to locate in said direction hole in the moon guide and the direction hole of the selected moon picture, the base further including a pair of upwardly directed arms for receiving the elevation finger therebetween.

3. A device as claimed in claim 1, wherein the globe longitude disc has a plurality of said radial longitude lines and notches for encompassing the earth's longitudes.

4. A device as claimed in claim 1, wherein the base sheet has a fold-down back panel, fold-down wedge shaped side panels and interconnecting means between the side panels and the back panels whereby the base sheet can be supported on an incline.

* * * * *